United States Patent
Fukui et al.

[11] Patent Number: 6,056,827
[45] Date of Patent: May 2, 2000

[54] LASER DECONTAMINATION METHOD

[75] Inventors: Yasutaka Fukui, Higashiibaraki-gun; Masanobu Nemoto, Mito; Kouki Shimizu, Adachi-ku; Shun-ichi Sato, Yono, all of Japan

[73] Assignee: Japan Nuclear Cycle Development Institute, Ibaraki-ken, Japan

[21] Appl. No.: 08/800,283

[22] Filed: Feb. 13, 1997

[30] Foreign Application Priority Data

Feb. 15, 1996 [JP] Japan .................................. 8-052500

[51] Int. Cl.[7] ...................................................... B08B 7/00
[52] U.S. Cl. ................................... 134/1; 134/2; 134/21; 134/32; 219/121.68; 219/121.69
[58] Field of Search ............................. 134/1, 2, 21, 32, 134/42; 219/121.6, 121.68, 121.69

[56] References Cited

U.S. PATENT DOCUMENTS

| | | | |
|---|---|---|---|
| 4,347,785 | 9/1982 | Chase et al. | 101/1 |
| 4,368,080 | 1/1983 | Langen et al. | 134/1 |
| 4,720,621 | 1/1988 | Langen | 219/121 |
| 4,839,181 | 6/1989 | MacMurray et al. | 426/237 |
| 4,871,897 | 10/1989 | Nielsen | 219/121.67 |
| 4,987,286 | 1/1991 | Allen | 219/121.68 |
| 5,256,848 | 10/1993 | Cartry et al. | 219/121.6 |
| 5,537,206 | 7/1996 | Akiyoshi et al. | 356/315 |
| 5,538,764 | 7/1996 | Li et al. | 427/554 |

FOREIGN PATENT DOCUMENTS

| | | |
|---|---|---|
| 0 195 825 | 10/1986 | European Pat. Off. . |
| 520847 | 12/1992 | European Pat. Off. . |
| 0 642 846 | 3/1995 | European Pat. Off. . |
| 642846 | 3/1995 | European Pat. Off. . |
| 2 688 726 | 9/1993 | France . |
| 44 07 755 | 9/1995 | Germany . |
| 55-70492 | 5/1980 | Japan . |
| 61-242273 | 10/1986 | Japan . |
| 63-241399 | 10/1988 | Japan . |
| 9513618 | 5/1985 | WIPO . |
| 88/01553 | 3/1988 | WIPO . |

OTHER PUBLICATIONS

H.K. Tönshoff et al. *Laser Inst. Am* 1994, 79, 333–342.
Y. Ori et al. *Reza Kenkyu* 1995, 23, 264–272.
K.C.A. Crane et al. *J. Appl. Phys.* 1980, 51, 5954–5961.
M.C. Edelson et al. Laser Inst. Am. 1995, 768–777.

*Primary Examiner*—Arlen Soderquist
*Attorney, Agent, or Firm*—Weneroth, Lind & Ponack, L.L.P.

[57] ABSTRACT

A laser decontamination method includes the steps of incorporation of a condenser lens in a gas supply nozzle, supplying a gas toward a contaminated member while moving the gas supply nozzle relatively to and along a surface of the contaminated member with a laser beam which is condensed by the condenser lens applied thereto, and thereby continuously melting or evaporating a contaminated surface layer so as to remove the same to clean the contaminated member. The gas is supplied asymmetrically with respect to the axis of the laser beam. For example, the gas supply nozzle maybe formed so that the axis of the laser beam agrees with that of the nozzle, with a plane of an opening of the nozzle inclined with respect to the axis of the laser beam; the nozzle maybe disposed so that the axis of the nozzle agrees with the direction of a normal line of the contaminated member with the plane of the opening of the nozzle inclined upwardly respect to the surface of the contaminated member in the advancing direction of the nozzle; and the gas maybe supplied in a diagonal direction with respect to the axis of the laser beam.

6 Claims, 4 Drawing Sheets

Laser beam – applied portion

Laser beam – applied portion

→ Scanning direction S

→ Scanning direction S

Laser beam-applied portion

Laser beam-applied portion

LASER DECONTAMINATION METHOD

BACKGROUND OF THE INVENTION

The present invention relates to a method of removing a contaminated surface layer by melting or evaporating the same with a laser beam applied to a contaminated member (an object to be decontaminated). Although the range of application of the techniques concerning this method is not specifically limited, they are effective, for example, in removing a radioactive contaminant from a surface of a member placed in such a radiation environment as in a nuclear reactor, and thereby cleaning (decontaminating) the contaminated member.

In various kinds of nuclear facilities, there are equipment, machines and tools exposed to radiation and coated at the outer surfaces thereof with a thin layer of a radioactive contaminant. The presence of such a layer of a radioactive contaminant places restrictions on workers, who make inspections of and carry out maintenance and repair of such equipment, machines and tools, with respect to various matters including operation time. In order that such operations can be carried out safely, a method of removing a radioactive contaminant from the surfaces of the equipment, machines and tools has been developed. One example of such a method is a laser decontamination method in which a contaminated surface layer is removed by melting or evaporating the same with a laser beam applied thereto.

An example of a prior art laser decontamination method is illustrated in FIG. 6. A condenser lens 12 is incorporated in a gas supply nozzle 10, and a gas is supplied to a contaminated material 14 as the gas supply nozzle 10 is moved along and relatively to a surface of the contaminated material 14 with a laser beam applied thereto. The gas supply nozzle 10 is formed of a cylindrical member gradually narrowed toward a free end portion (lower portion in FIG. 6) thereof, and a plane 16 of an end surface of an opening at the free end of the nozzle is opposed to the contaminated member 14 in parallel therewith. The axis (vertical axis) 10a of the gas supply nozzle 10 agrees with an optical axis 18a of a laser beam 18. A side wall of gas supply nozzle 10 is provided with gas introduction ports 20, 21, through which a gas is supplied to the interior of the gas supply nozzle 10. The advancing direction of the gas supply nozzle 10 (laser beam scanning direction) with respect to the contaminated member 14 is shown by an arrow S.

When the laser beam 18 condensed by the condenser lens 12 is applied to the contaminated material 14, the portion of a contaminated surface layer of the contaminated member 14 to which the laser beam is applied is heated rapidly, and melting and/or evaporation of the surface layer occur. When the molten material or the evaporated material is scattered or moved, the contaminated surface layer is removed, i.e., the laser beam-applied portion 14a of the contaminated material 14 is decontaminated. During this decontamination operation, the gas supplied from the plane of the opening 16 of the nozzle 10 works to spatially control the molten material or evaporated material (works to move the molten material or evaporated material from the laser beam-applied portion 14a to the outside by the kinetic energy of the gas molecules or by a dynamic pressure of the gas), and to prevent an oxidation reaction from occurring in the laser beam-applied portion 14a.

The laser beam 18 on the surface of the contaminated member is in the shape of a dot when the condenser lens 12 comprises a spherical lens, and becomes linear when the condenser lens 12 comprises a cylindrical lens. Therefore, when the contaminated member 14 is scanned with the laser beam 18 or the contaminated member 14 is moved, a linear or planar decontaminated surface can be obtained respectively. Since a high decontamination area processing rate is demanded generally, a cylindrical lens is used as the condenser lens 12 in many cases.

When the laser beam 18 is applied to the surface of the contaminated member 14 by such a method as described above, a molten layer on the surface of the contaminated member 14 is forced out toward the circumference of the laser beam-applied portion due to the influence of an evaporation reaction force, and the scattered molten substances and evaporated substances are deposited again on the surface of the contaminated member 14. Therefore, the profile of the surface of the laser beam-applied portion becomes as shown in FIG. 7A in many cases. Namely, a projection 22 occurs around the laser beam-applied portion.

When the contaminated member 14 in this condition is scanned with the laser beam or moved as previously described, this phenomenon occurs repeatedly, so that the profile of the surface of the laser beam-applied portion becomes as shown in FIG. 7B. Namely, the degree of unevenness of the surface of the laser beam-applied portion becomes high, and an effective decontamination depth cannot be obtained. Since the molten substances and evaporated substances are contaminated, the laser beam-applied surface influenced by the recoagulation and redeposition of these substances is not sufficiently decontaminated.

SUMMARY OF THE INVENTION

An object of the present invention is to provide a laser decontamination method capable of obtaining a smooth decontaminated surface of a high cleanness free from the influence of recoagulation and redeposition of the contaminated substances by eliminating the above-described drawbacks encountered in the prior art technique, and spatially controlling the occurrence of projections around the laser beam-applied portion of a contaminated material.

The present invention is directed to a laser decontamination method comprising the steps of incorporating a condenser lens in a gas supply nozzle, supplying a gas toward a contaminated member while moving the gas supply nozzle relatively to and along a surface of the contaminated member with a laser beam which is condensed by the condenser lens applied thereto, and thereby continuously melting or evaporating a contaminated surface layer so as to remove the same, whereby the contaminated member is cleaned. The characteristics of the present invention reside in that the gas is supplied asymmetrically with respect to the axis of the laser beam.

Concretely speaking, the present invention uses a structure in which the gas supply nozzle is formed so that the axis of the laser beam agrees or coincides with that of the nozzle with a plane of an opening of the nozzle inclined with respect to the axis of the laser beam and is disposed so that the axis of the nozzle agrees with the direction of a normal line of the contaminated member, with the plane of the opening of the nozzle inclined upwardly with respect to the surface of the contaminated member in the advancing direction of the nozzle, the gas being supplied in a diagonal direction with respect to the axis of the laser beam. The present invention also includes a structure in which the gas supply nozzle wherein the axis of the laser beam is parallel to and offset with respect to that of the nozzle is disposed so that the axis of a gas flow is behind the axis of the laser beam with respect to the advancing direction of the nozzle.

When the gas supply nozzle is disposed so that the plane of the opening thereof is inclined upwardly with respect to the surface of the contaminated member in the advancing direction of the nozzle, the gas is not symmetrically supplied with respect to the axis of the nozzle. Namely, the distribution of the velocity vector of the supplied gas includes a large quantity of components in the direction in agreement with the scanning direction of the laser beam. Accordingly, the scattered molten substances and evaporated substances receive a force in the direction in agreement with the scanning direction of the laser beam, so that a projection in the profile of the surface of the laser beam-applied portion always occurs only at the front side in the scanning direction. Consequently, a smooth decontaminated surface of a large decontaminated depth not influenced by recoagulation and redeposition of molten and evaporated contaminants is obtained. When the gas supply nozzle is disposed so that the axis of a gas flow is behind the axis of the laser beam, which is offset from the axis of the nozzle, with respect to the advancing direction of the nozzle, the scattered molten substances and evaporated substances occurring due to the applied laser beam also receive a force in the direction in agreement with the scanning direction of the laser beam, so that the same effect is obtained.

PREFERRED EMBODIMENTS OF THE INVENTION

Figure 1:
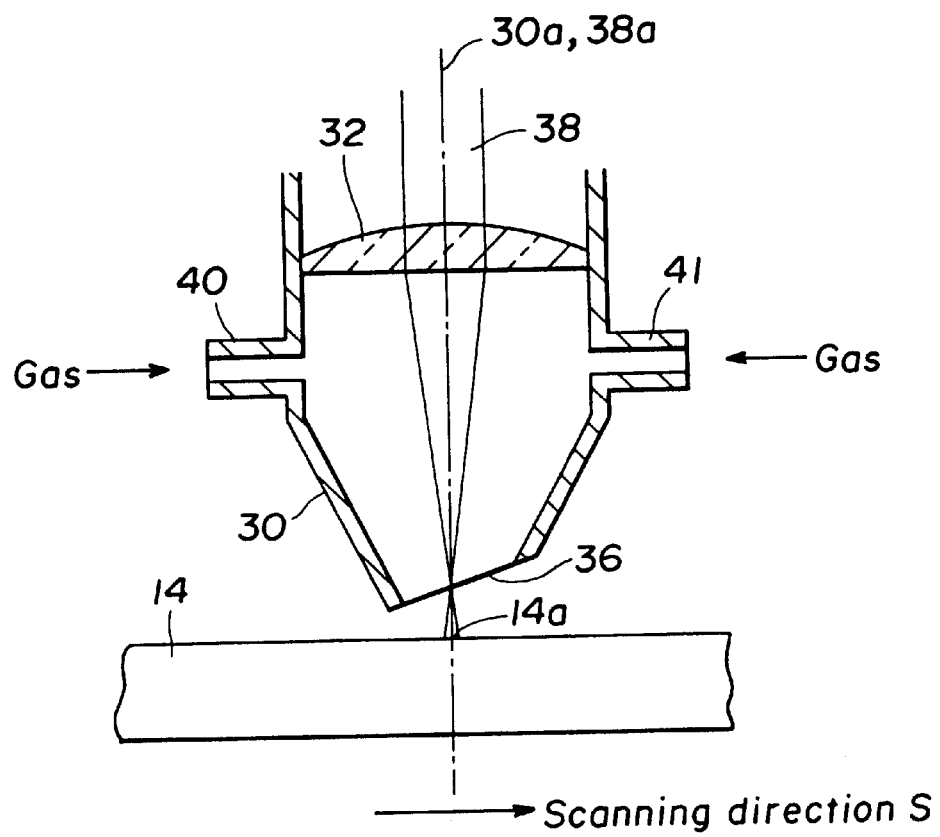
FIG. 1 is an explanatory drawing showing an embodiment of the laser decontamination method according to the present invention.

FIG. 1 is an explanatory view showing an embodiment of the laser decontamination method according to the present invention. This method is basically similar to a method based on the prior art technique, which includes the steps of incorporating a condenser lens 32 in a gas supply nozzle 30, supplying a gas toward a contaminated member 14 while moving the gas supply nozzle 30 relatively to and along a surface of the contaminated member 14 in the direction of an arrow S with a laser beam applied thereto, and thereby continuously melting or evaporating a contaminated surface layer so as to remove the same, whereby the contaminated member is cleaned.

In the gas supply nozzle 30, an inverted frusto-conical portion is provided on an end part (lower end part in FIG. 1) of a substantially cylindrical portion, and a free end part of the inverted frusto-conical portion is cut diagonally to obtain a plane 36 of an opening of the nozzle. Although an axis 38$a$ of a laser beam 38 agrees with an axis 30$a$ of the nozzle, the plane 36 of the opening of the nozzle is inclined (not perpendicular) with respect to the 38$a$ of the laser beam 38. The gas supply nozzle 30 is set so that the axis 30$a$ thereof agrees with the direction of a normal line of the contaminated member 14 with the plane 36 of the opening of the nozzle inclined upwardly with respect to the surface of the contaminated member 14 in the scanning direction S of the laser beam (advancing direction of the nozzle). A gas is supplied from gas introduction ports 40, 41 provided in a side wall of the gas supply nozzle 30, and is emitted from the end opening of the gas supply nozzle 30 onto the contaminated member 14 in a direction diagonal with respect to the axis 38$a$ of the laser beam.

A laser capable of being used in the present invention may be any kind of laser as long as it can emit a laser beam of an intensity high enough to melt or evaporate a contaminated surface layer. Examples of such a laser include a $CO_2$ laser, a CO laser, an iodine laser, a Nd:YAG laser, a copper vapor laser and an excimer laser. The condenser lens may comprise a cylindrical lens or a spherical lens just as in a prior art method.

Figure 2A:
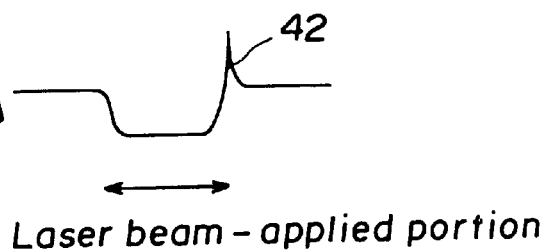
FIGS. 2A and 2B are an explanatory drawings of a laser beam-applied portion in this method.
Figure 2B:
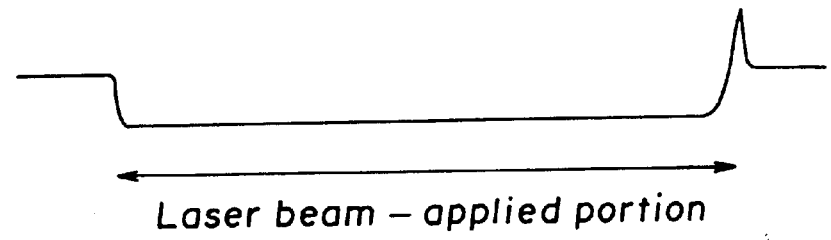

The laser beam 38 emitted from a laser (not shown) is condensed by the condenser lens 32 and applied to the surface of the contaminated member 14. A laser beam-applied portion is designated by a reference numeral 14$a$. A gas introduced from gas introduction ports 40, 41 is supplied from the plane 36 of the opening of the nozzle toward the contaminated member 14. Since the plane 36 of the opening of the nozzle is inclined as mentioned above, the gas is not symmetrically supplied with respect to the axis 30$a$ (which agrees with that 38$a$ of the laser beam) of the nozzle. Namely, the distribution of the velocity vector of the gas supplied from the plane 36 of the opening of the nozzle includes a large quantity of components in a direction in agreement with the scanning direction S of the laser beam. Therefore, the molten layer or evaporated substances of the contaminated material receive a force in the scanning direction shown by arrow S. As a result, the profile of the surface of the laser beam-applied portion has a projection 42 as shown in FIG. 2B which occurs only in the direction in which the plane of the opening of the nozzle is opened. When the contaminated member is scanned with the laser beam 38, the projection 42 always occurs only on the front side in the scanning direction S, and a smooth decontaminated surface of a large decontamination depth free from the influence of the recoagulation and redeposition of contaminants is obtained as shown in FIG. 2B.

The gas suitably used in this method is an inert gas, such as Ar, He and $N_2$. When oxidation is allowed, or, when oxidation heat is utilized, air and $O_2$ can also be used. When a certain surface treatment is conducted simultaneously with a decontamination operation, another kind of gas suitable for the treatment is used in some cases. Namely, the gas supplied to the contaminated member fulfils the function of spatially controlling the molten or evaporated substances, preventing the occurrence of an oxidation reaction on a laser beam-applied surface, and subjecting such surface to other kinds of surface treatment. The spatial control operation referred to above is an operation for moving the molten substances and evaporated substances from the laser beam-applied portion to the outside by the kinetic energy of the gas molecules or the dynamic pressure of the gas. For this purpose alone, any kind of gas can be used. For the prevention of oxidation, an inert gas, such as Ar, He and $N_2$ is suitable as mentioned above. The gas also fulfils the function of transporting product substances (for example, contaminant particles produced in the melting or evaporation step) to a filter in some cases.

Figure 3:
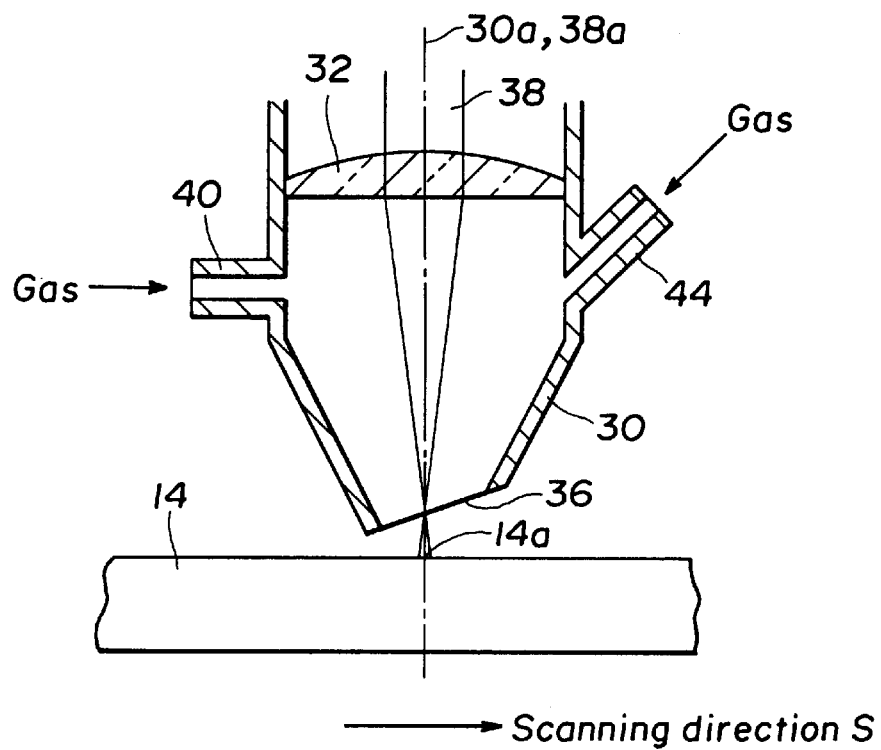
FIG. 3 is an explanatory drawing showing another embodiment of the present invention.

In this embodiment, the gas introduction ports are provided on both the front and rear sides in the nozzle advancing direction. When the gas introduction ports are provided on only the front side in the nozzle advancing direction, a large effect is obtained in some cases. When a gas introduction port 44 on the front side in the nozzle moving direction is provided so as to extend diagonally downwardly as shown in FIG. 3, a large effect is obtained in some cases. Since the basic construction of the structure of FIG. 3 is identical with that of the structure of FIG. 1, the corresponding members are designated by the same reference numerals, and descriptions thereof are omitted.

Figure 4:
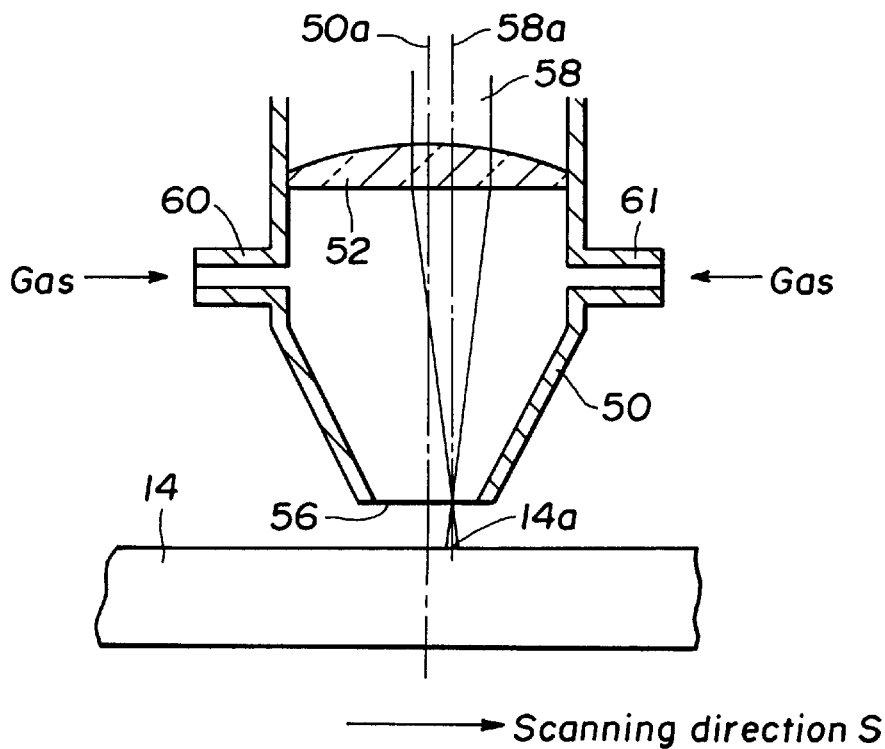
FIG. 4 is an explanatory drawing showing still another embodiment of the present invention.

FIG. 4 shows another embodiment of the laser decontamination method according to the present invention. In this embodiment, the shape of a gas supply nozzle is basically identical with that of a conventional gas supply nozzle but the position of the axis of a laser beam differs. The gas supply nozzle 50 has a cylindrical portion a free end part (lower part in FIG. 4) of which has a downwardly convergent shape, and a condenser lens 52 is incorporated in the interior of the cylindrical portion, a plane 56 of a free opened end of the nozzle being squarely opposed to a contaminated member 14. The gas supply nozzle 50 is provided in its side wall with gas introduction ports 60, 61, through which a gas is supplied to the interior of the gas supply nozzle 50. The advancing direction (laser beam scanning direction) of the gas supply nozzle 50 with respect to the contaminated member 14 is shown by an arrow S. In this embodiment, an axis 58a of a laser beam 58 is set parallel to and eccentric with respect to an axis 50a of the nozzle 50. The gas supply nozzle 50 is disposed so that the axis of a gas flow (position of the axis 50a of the nozzle 50) is on the rear side of that 58a of the laser beam in the nozzle advancing direction. When such a structure is employed, the gas is supplied asymmetrically with respect to the laser beam-applied portion 14a, i.e., more onto the rear side part thereof in the scanning direction S, so that a profile of the surface of the laser beam-applied portion becomes identical with that shown in FIG. 2A, whereby a smooth decontaminated surface of a large decontamination depth free from the influence of recoagulation and redeposition of contaminants and identical with the surface shown in FIG. 2B is obtained.

Figure 5:
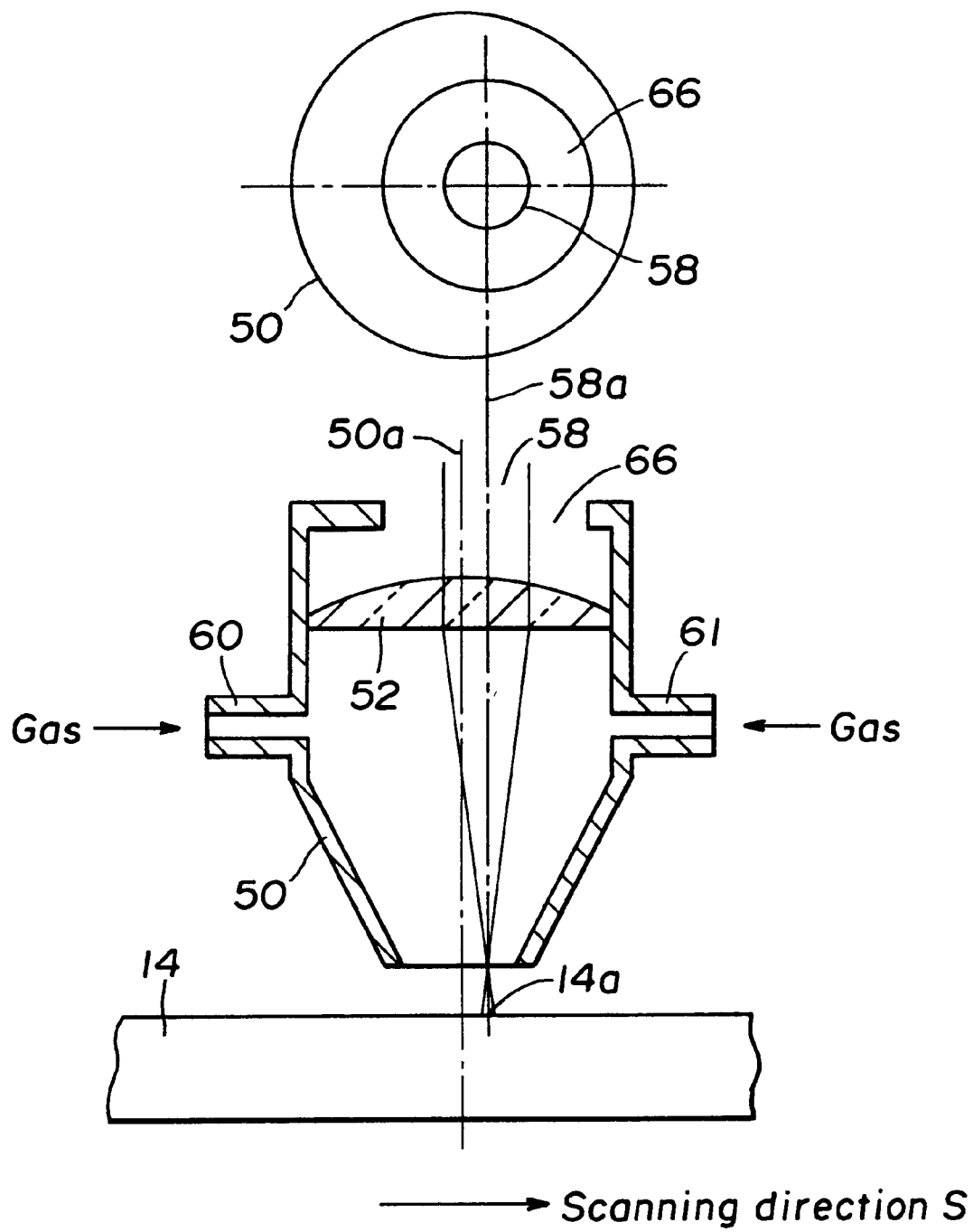
FIG. 5 is an explanatory drawing showing another embodiment of the present invention.
Figures 6, 7A, 7B:
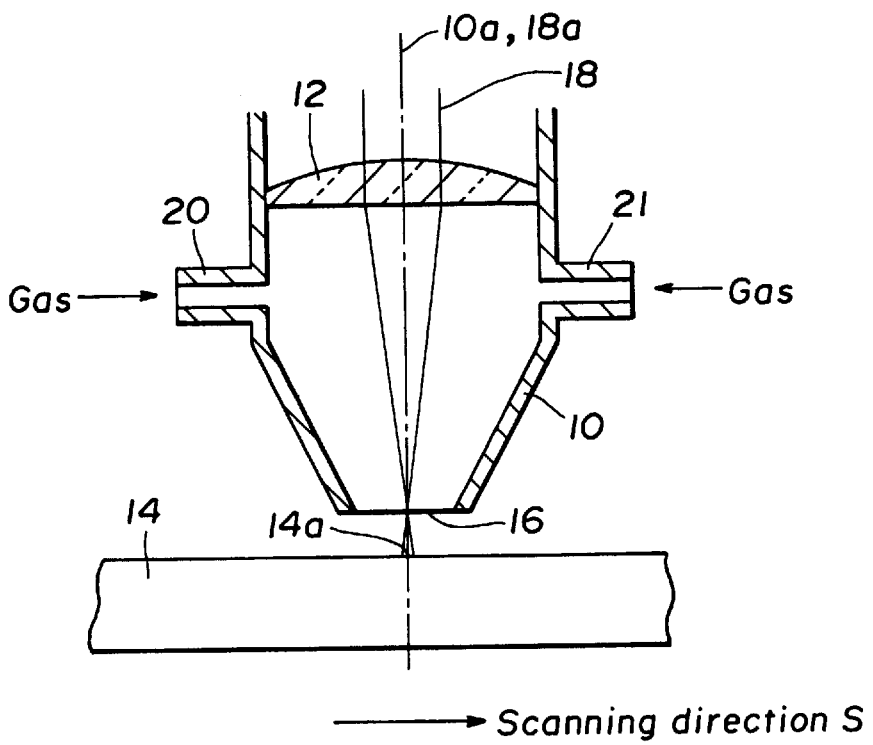
FIG. 6 is an explanatory drawing showing an example of prior art methods.
FIGS. 7A and 7A are an explanatory drawings of a laser beam-applied portion in the prior art method.

In order to set the axis of the laser beam in a predetermined eccentric condition, it is effective to make an elaborate modification to the shape of an upper end portion of the gas supply nozzle 50 constructed as shown in FIG. 4, and obtain a structure shown in FIG. 5. Namely, if a mounting hole 66 for fixing a laser or a laser beam introduction unit (not shown) to an upper end portion of the gas supply nozzle 50 is formed so as to be offset from the axis 50a of the nozzle, and, if the laser or laser beam introduction unit is then fitted in this mounting hole 66, the condition in which the axis 58a of the laser beam and the axis 50a of the nozzle are offset from each other by a predetermined distance can be automatically attained.

In these embodiments, the decontamination of a member contaminated with radioactive contaminants is illustratively described but the present invention is not limited thereto. It is a matter of course that the present invention can also be applied in the same manner to the removal of rust from a metal surface and paint and coatings of various materials therefrom.

As described hereinbefore, in the present invention, a gas is supplied asymmetrically with respect to the axis of a laser beam as described above. Therefore, a decontaminated surface free from the influence of recoagulation and redeposition of molten substances and evaporated substances and having a high degree of smoothness, a large decontamination depth, a high integrity and a high decontamination coefficient (a high cleanness) is obtained.

What is claimed is:

1. A method for decontaminating a contaminated member, said method comprising:

moving in an advancing direction relative to and along a surface of said contaminated member a gas supply nozzle having an axis and an outlet opening defined along a plane, while supplying a gas from said nozzle toward said contaminated member, and while applying to said contaminated member a laser beam condensed by a condenser lens incorporated in said nozzle, thereby continuously melting or evaporating and removing a contaminated surface layer of said member, whereby said contaminated member is cleaned;

said axis of said nozzle coinciding with an axis of said laser beam;

said plane defining said outlet opening being inclined with respect to said axis of said laser beam in a direction away from said surface of said contaminated member relative to said advancing direction; and said gas being supplied toward said contaminated member in a direction diagonal to said axis of said laser beam.

2. A method as claimed in claim 1, further comprising introducing said gas into an interior of said nozzle through at least one gas introduction port provided in a side wall of said nozzle.

3. A method as claimed in claim 2, comprising introducing said gas through gas introduction ports provided at both front and rear sides of said nozzle relative to said advancing direction.

4. A method as claimed in claim 3, wherein at least one said gas introduction port is inclined in a direction away from said outlet opening.

5. A method as claimed in claim 2, wherein said gas is introduced through a single gas introduction port provided at a front side of said nozzle relative to said advancing direction.

6. A method as claimed in claim 5, wherein said single gas introduction port is inclined in a direction away from said outlet opening.

* * * * *